A. T. BROWN.
MOTOR AGRICULTURAL MACHINE.
APPLICATION FILED JULY 15, 1918.
1,385,041.
Patented July 19, 1921.
3 SHEETS—SHEET 2.
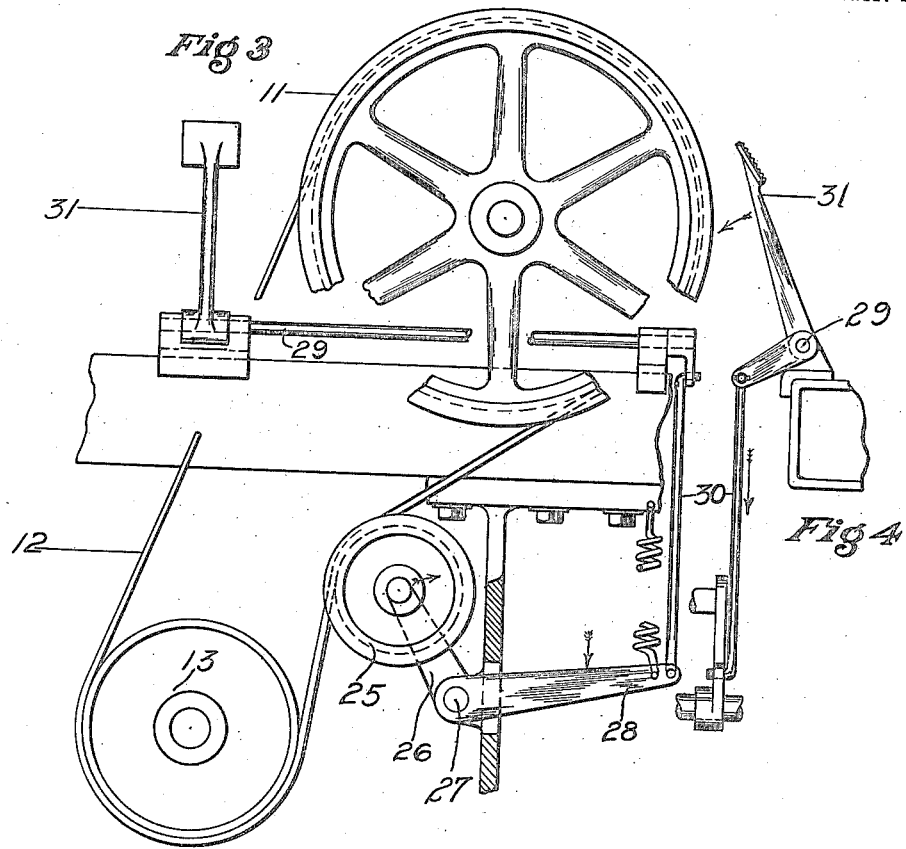
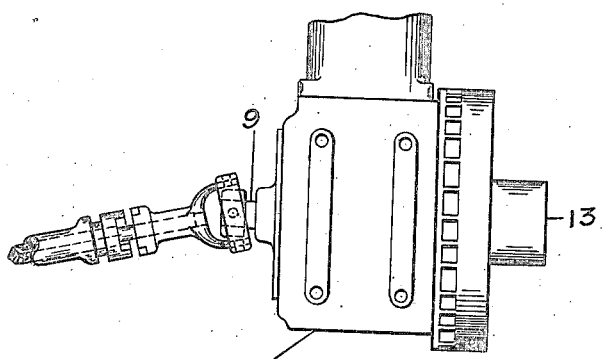
INVENTOR.
Alexander T. Brown
BY Parsons & Bodell
ATTORNEYS.

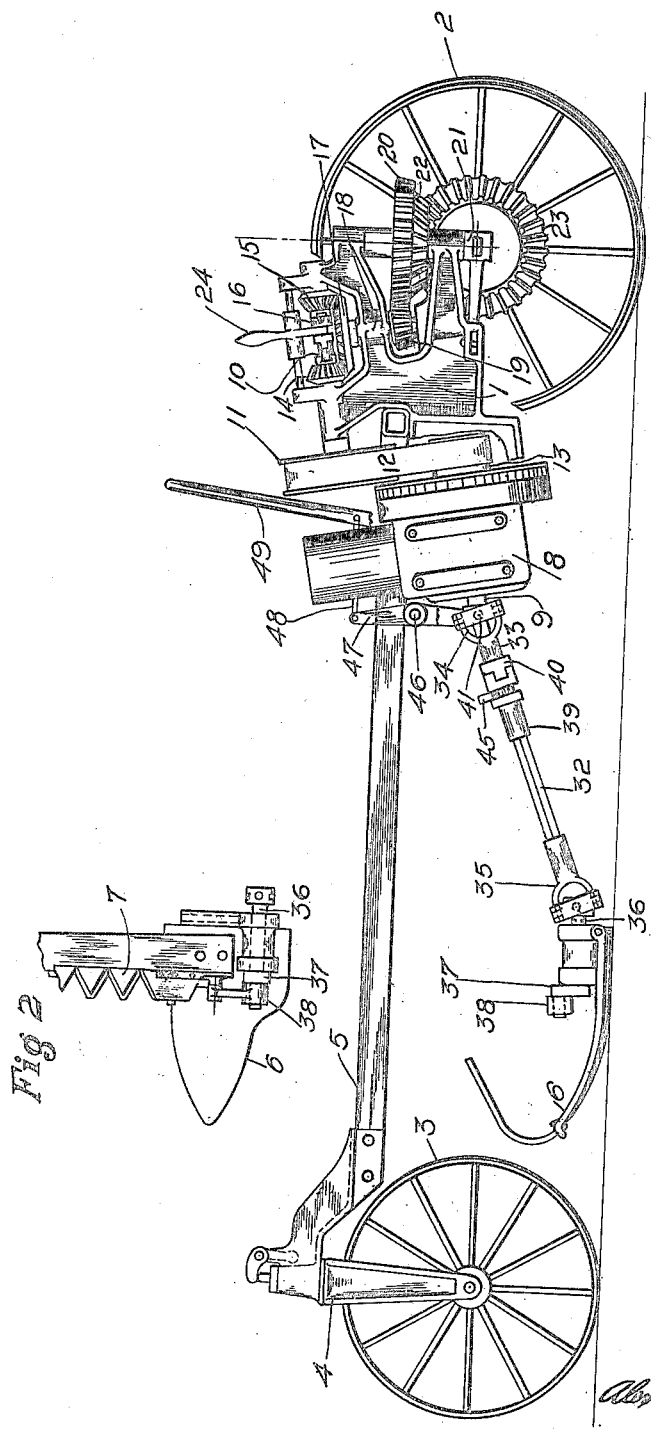

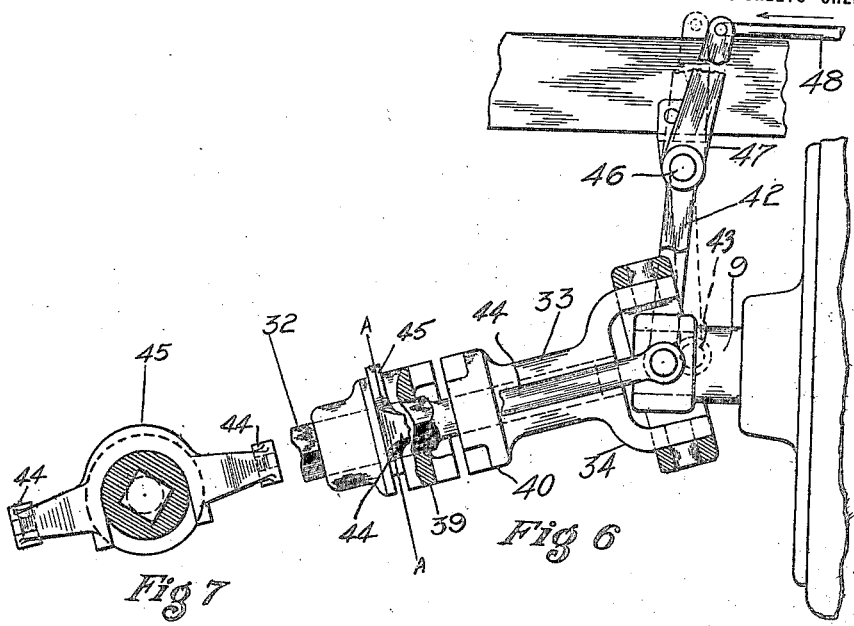
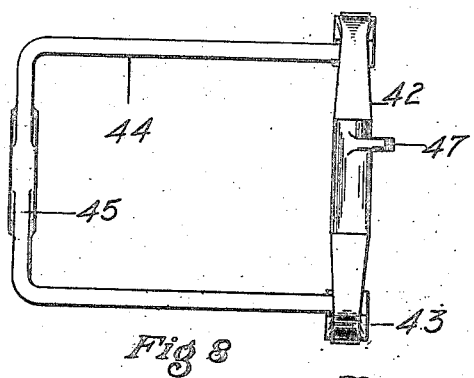
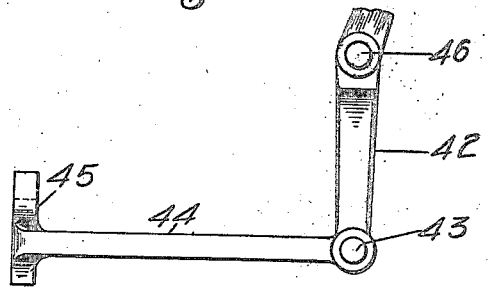

UNITED STATES PATENT OFFICE.

ALEXANDER T. BROWN, OF SYRACUSE, NEW YORK.

MOTOR AGRICULTURAL MACHINE.

1,385,041.   Specification of Letters Patent.   Patented July 19, 1921.

Application filed July 15, 1918. Serial No. 245,024.

*To all whom it may concern:*

Be it known that I, ALEXANDER T. BROWN, a citizen of the United States, and a resident of Syracuse, in the county of Onondaga and State of New York, have invented a certain new and useful Motor Agricultural Machine, of which the following is a specification.

This invention relates to motor agricultural machines and has for its object a particularly simple and efficient arrangement of the engine and the power transmitting mechanism between the engine shaft and the driving wheel of the machine, and the movable member or mechanism of the implement. The invention consists in the combinations and constructions hereinafter set forth and claimed.

In describing this invention, reference is had to the accompanying drawings in which like characters designate corresponding parts in all the views.

Figure 1 is a side elevation, partly broken away, of a machine embodying my invention.

Fig. 2 is a detail view of the mower bar and contiguous parts.

Fig. 3 is an elevation, partly broken away, of the driving means and clutch between the engine shaft and the power transmitting mechanism connected to the tractor wheel.

Fig. 4 is a detail view of the clutch operating means shown in Fig. 3.

Fig. 5 is a detail view, partly broken away, illustrating the clutch connection between the engine shaft and the mower knife.

Fig. 6 is an enlarged detail view of said connections, and the means for operating the clutch thereof.

Fig. 7 is a sectional view taken on the plane of line A—A, Fig. 6.

Figs. 8 and 9, are respectively, a plan and side elevation of the shifting fork for the clutch shown in Fig. 6.

1 designates the frame which may be of any suitable form, size and construction; 2, is the traction or driving wheel which is, in this form of my invention, located at the rear end of the frame. 3 is a steering wheel mounted on a fork 4 which in this form of my invention, is shown as carried at the front end of a frame element 5 extending forwardly from the frame 1.

6 designates the agricultural implement, the implement here shown being a mower including a reciprocating knife 7.

8 is the engine supported by the frame 1, the engine being usually of the internal combustion type although any form of motor may be employed. The crank shaft 9 of the engine is connected to the tractor wheel 2 and to the knife 7 by independently operable and controllable power transmitting means.

In this embodiment of my invention, there is power transmitting means between one end of the crank shaft 9 and the tractor wheel 2 which is controlled by clutch means, and power transmitting means between the other end of the crank shaft, and the knife 7, the latter being controlled by another clutch means.

The power transmitting means between the rear end of the shaft 9 and the wheel 2 includes a shaft 10 having a pulley 11 thereon connected by a belt 12 to a pulley 13 on the crank shaft, bevel pinions 14 and 15 loosely mounted on the shaft 10 and having clutch faces on opposing sides thereof, a clutch section 16 keyed to the shaft 10 and slidable along the same to connect either gear 14 or 15 to the shaft, a bevel gear 17 mounted on a vertically extending shaft 18 journaled in the frame 1 and meshing with the bevel pinions 14, 15, a gear 19 mounted on the lower end of the shaft 18 and meshing with a gear 20 mounted on a spindle 21 which also has a bevel gear ring 22 thereon, and a gear ring 23 on the wheel 2 meshing with the gear 22. The clutch 16 is shifted by a suitable means as a sliding handle 24. When either one of the gears 14 or 15 is clutched to the shaft 10 the power will be transmitted from the crank shaft 9 to the shaft 10 by the pulley 11 through the gear 14 or 15 to the bevel gear 17, shaft 18 and gears 19, 20, 22 and 23. The gears 14 and 15 drive the gear 17 and hence the tractor wheel in opposite directions.

Suitable locking means such as described in my Patent No. 1,247,073, issued November 20, 1917, is provided for holding the wheel 2 from movement about the shaft 21 and for controlling the swinging of the said wheel about said shaft, in order to steer the machine but as this mechanism forms no part of my present invention, further description thereof is thought to be unnecessary.

The clutch means between the engine shaft and the power transmitting means of the tractor includes means for tightening or loosening the belt 12 as an idler pulley 25 engaging the belt and carried on the arm 26 mounted on a rock shaft 27 having a second arm 28 thereon which is connected to a rock shaft 29 by means of a link 30, the shaft 29 having an operating lever or pedal 31 thereon.

The power transmitting mechanism between the shaft 9 and the knife 7 of the mower is in this embodiment of my invention, connected to one end of the engine shaft.

32 is a shaft section journaled at one end in a hollow section 33 connected by a universal joint 34 fastened to the front end of the crank shaft 9, the shaft section 32 being connected at its other end by a universal joint 35 fastened to a shaft 36 having a crank 37 thereon which is connected by a link 38 to the knife 7 to reciprocate the same. The means for controlling the rotation of the shaft 32 comprises a clutch section 39 slidable lengthwise of the shaft 32 into and out of engagement with the clutch section 40 on the shaft 32.

The mower and the support for the same are movable to different elevations in the ordinary manner to avoid stones, stumps, and other obstructions on the ground and to follow the contour of the ground, and are raised by hand as is understood by those skilled in the art. In this lifting and lowering movement the mower moves about a transverse horizontal axis at 41 near the axis of the universal joint 34.

The clutch section 39 is shiftable by means movable about said axis 41 and, as here shown, including a yoke 42 pivoted at 43 to the rear ends of links 44 extending on opposite sides of the shaft 32 and carrying at their front ends a fork 45 coacting with the clutch. This yoke 42 is mounted upon a shaft 46 carried by the frame and is operable by any suitable means as the lever 49 connected by a link 48 to a rock arm 47 on the shaft 46.

Obviously, upon movement of the lever 49 in one direction or the other, the clutch section 39 will be shifted into or out of engagement with the clutch section 40.

The handle 49, pedal 31 and other controlling means for lifting the knife and also the means for steering the front wheel 3 are all grouped together within reach of the operator.

This invention is particularly advantageous in that there are direct and independent driving means between the engine shaft and the tractor wheel and between the engine shaft and the mower knife, or other movable member, and in that it provides a particularly simple, economical and strong construction consisting of comparatively few parts.

What I claim is:

1. In an agricultural machine, the combination of a frame, a drive wheel, an implement including a movable member, a motor having a drive shaft and located with its drive shaft extending lengthwise of the frame and the drive wheel being located to the rear of the motor and the implement near the front end of the frame and in front of the motor, and independently operable and controllable power transmitting means between the rear end of the motor shaft and the drive wheel and between the front end of the motor shaft and the movable member of the implement, the power transmitting means connected to said movable member extending forwardly from the front end of said shaft and being arranged end to end therewith, substantially as and for the purpose described.

2. In an agricultural machine, the combination of an implement movable to different elevations about a substantially horizontal axis, said implement including a movable member, an engine, and connections between the engine and the movable member of the implement including shaft sections connected respectively to the engine shaft and to the implement by universal joints, a clutch for connecting the shaft sections including a shiftable member slidable lengthwise of one of the shaft sections, and means for shifting the clutch member including a shifter pivoted on a transverse axis near the axis of the universal joint between one shaft section and the engine shaft, substantially as and for the purpose specified.

In testimony whereof, I have hereunto signed my name, at Syracuse, in the county of Onondaga, and State of New York, this 5th day of July, 1918.

ALEXANDER T. BROWN.